(12) United States Patent
nieto et al.

(10) Patent No.: US 11,376,928 B2
(45) Date of Patent: Jul. 5, 2022

(54) AIR REGISTER ASSEMBLY

(71) Applicant: Ford Global Technologies, LLC, Dearborn, MI (US)

(72) Inventors: Jorge Araujo nieto, Calimaya (MX); Gustavo Llamas Maldonado, Delagacion Miguel Hidalgo (MX); Jose Carlos Hernandez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 482 days.

(21) Appl. No.: 16/429,332

(22) Filed: Jun. 3, 2019

(65) Prior Publication Data
US 2020/0376932 A1    Dec. 3, 2020

(51) Int. Cl.
*B60H 1/34*    (2006.01)

(52) U.S. Cl.
CPC ... *B60H 1/3428* (2013.01); *B60H 2001/3464* (2013.01)

(58) Field of Classification Search
CPC ............... B60H 1/3428; B60H 2001/3464
USPC ............................................. 454/155
See application file for complete search history.

(56) References Cited

U.S. PATENT DOCUMENTS

| 4,377,107 | A | * | 3/1983 | Izumi | ............... | B60H 1/3428 |
| | | | | | | 454/155 |
| 5,056,420 | A | * | 10/1991 | Komori | ............. | B60H 1/3428 |
| | | | | | | 454/155 |
| 2013/0029582 | A1 | | 1/2013 | Takai et al. | | |
| 2018/0304726 | A1 | | 10/2018 | Araujo Nieto et al. | | |

FOREIGN PATENT DOCUMENTS

| DE | 10063189 B4 | 4/2007 |
| DE | 102014001959 A1 | 8/2015 |
| DE | 102006032587 A1 | 3/2016 |
| KR | 20150070561 A | 6/2016 |

* cited by examiner

*Primary Examiner* — Steven S Anderson, II
*Assistant Examiner* — Phillip Decker
(74) *Attorney, Agent, or Firm* — Vichit Chea; Price Heneveld LLP (57) ABSTRACT

An air register assembly may include a vent housing having an outlet, an inlet, and a body portion disposed therebetween. The body portion may include a first portion disposed adjacent to the inlet, and a second portion that is wider than the first portion disposed adjacent to the outlet. At least one panel may be slideably coupled to the first portion of the vent housing between extended and retracted positions. The at least one panel may be substantially disposed within the first portion of the vent housing when the at least one panel is in the retracted position, and further wherein the at least one panel may be substantially disposed within the second portion of the vent housing when the at least one panel is in the extended position.

11 Claims, 5 Drawing Sheets

AIR REGISTER ASSEMBLY

FIELD OF THE INVENTION

The present disclosure generally relates to an air register for use in a vehicle. More specifically, the present disclosure relates to an air register that reduces recirculation airflow in an airflow passage.

BACKGROUND OF THE INVENTION

Numerous variations of air registers for directing air throughout the cabin of a vehicle are currently in use. Traditionally, air registers may be distributed along the dashboard or instrument panel at the front of the vehicle cabin to direct the air flow throughout. Upon pivoting the air registers in a desired airflow direction, a portion of the airflow may become disrupted from the aiming position and recirculated. Therefore, airflow may become decreased as a portion of the airflow may be dispersed within the air register, rather than directed through the air register.

SUMMARY OF THE INVENTION

According to one aspect of the present disclosure, an air register includes a vent housing having an outlet, an inlet, and a body portion disposed therebetween. The body portion includes a first portion disposed adjacent to the inlet, and a second portion that is wider than the first portion disposed adjacent to the outlet and having opposed first and second sidewalls. A frame assembly is pivotally supported within an interior of the second portion and operable between first and second positions. The frame assembly includes a first side adjacent to the first sidewall of the second portion and a second side adjacent to the second sidewall of the second portion. The frame assembly further includes a first panel coupled with the first side and a second panel coupled with the second side. The first panel blocks a portion of the interior adjacent the first sidewall of the second portion of the vent housing when the frame assembly is in the first position, and the second panel blocks a portion of the interior adjacent the second sidewall of the second portion of the vent housing when the frame assembly is in the second position.

According to another aspect of the present disclosure, an air register assembly includes a vent housing having an outlet, an inlet, and a body portion disposed therebetween. The body portion includes a first portion disposed adjacent to the inlet, and a second portion that is wider than the first portion disposed adjacent to the outlet. At least one panel slideably is coupled to the first portion of the vent housing between extended and retracted positions. The at least one panel is substantially disposed within the first portion of the vent housing when the at least one panel is in the retracted position, and the at least one panel is substantially disposed within the second portion of the vent housing when the at least one panel is in the extended position.

According to yet another aspect of the present disclosure, an air register includes a vent housing having an outlet, an inlet, and a body portion disposed between the outlet and the inlet. The body portion includes a first portion disposed adjacent to the inlet, and a second portion disposed adjacent to the outlet. The second portion has a first sidewall and a second sidewall defining a first width. A frame assembly is pivotally supported within an interior of the second portion. The frame assembly includes a first side adjacent to the first sidewall of the second portion and a second side adjacent to the second sidewall of the second portion and at least one flap coupled with one of the first side the second side. The at least one flap constricts airflow from the inlet to the outlet to a second width less than the first width.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
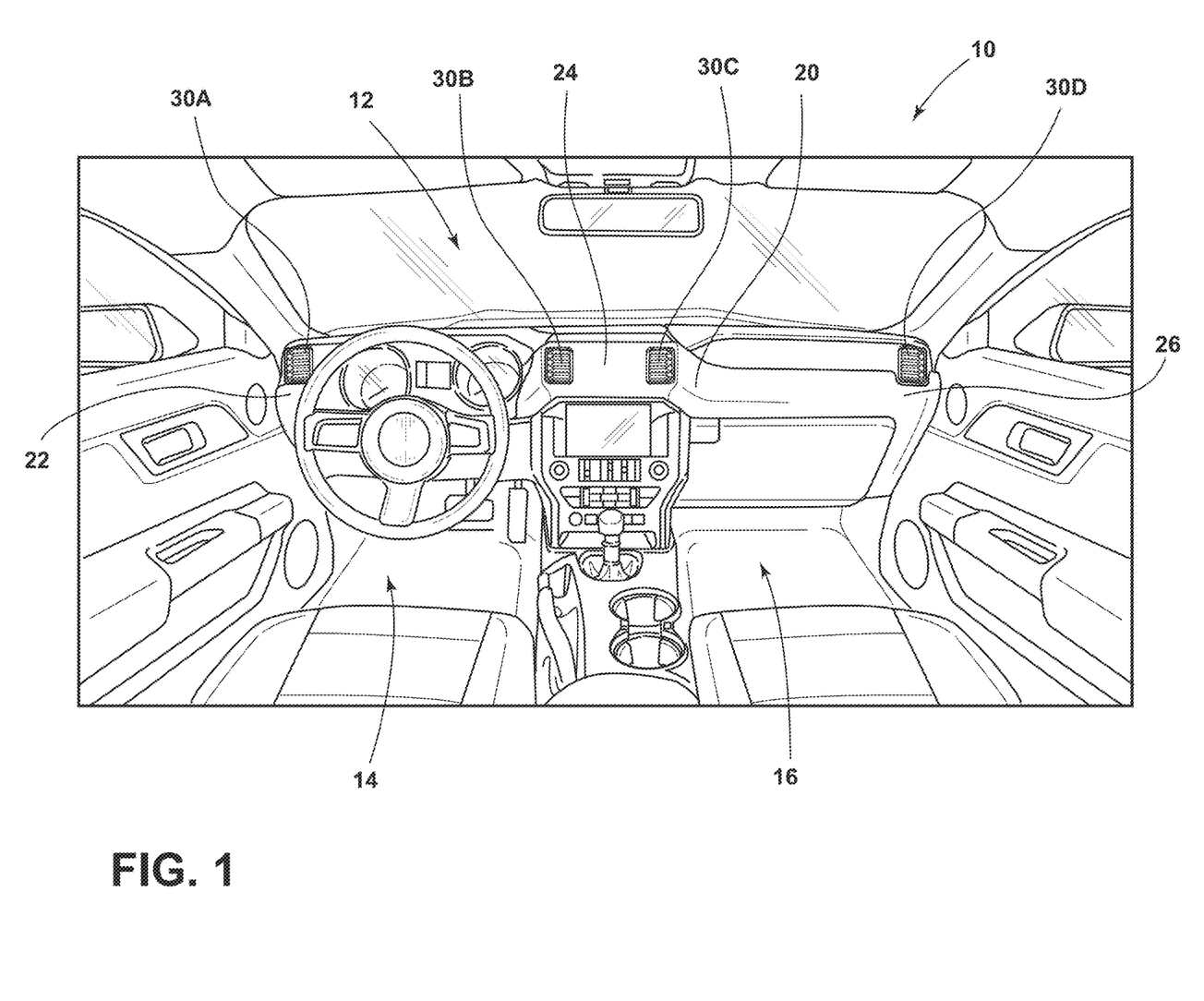
FIG. 1 is a is a front perspective view of an instrument panel having multiple air registers according to various aspects described herein.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10, such as a wheeled automotive vehicle, is shown with an interior cabin 12 having air registers 30A-30D according to various aspects described herein. The cabin 12 is subdivided into a driver's side region 14 and a passenger's side region 16. Spanning the entire front of the cabin 12 is an instrument panel 20 that may be divided into a driver side portion 22, a center-stack portion 24, and a passenger side portion 26. Each of these portions 22, 24, 26 may serve different functions and include various electrical and mechanical components. Disposed within each of these portions 22, 24, 26 may be the air registers 30A-30D, collectively referred to as air register assemblies, or air registers 30, throughout this disclosure having a number of shared features. The air registers 30 may be in the form of a barrel-type air register. These air registers 30 may be distributed throughout the instrument panel 20 to allow for adequate direction of air flow through the vehicle cabin 12. In some examples, the air register 30A may be disposed in the driver side portion 22, air registers 30B, 30C may be disposed within the center-stack portion 24, and air register 30D may be disposed in the passenger side portion 26. The configuration of air registers 30 shown in FIG. 1 is exemplary only, and it is contemplated that the configuration and dispersal of the air registers 30 across the instrument panel 20, or other regions of the vehicle 10, may be varied depending on the configuration of the vehicle 10. Furthermore, it is within the scope of aspects described herein for the air registers 30 to be used on any vehicle, and is not limited to an automobile as illustrated in FIG. 1.

Figure 2:
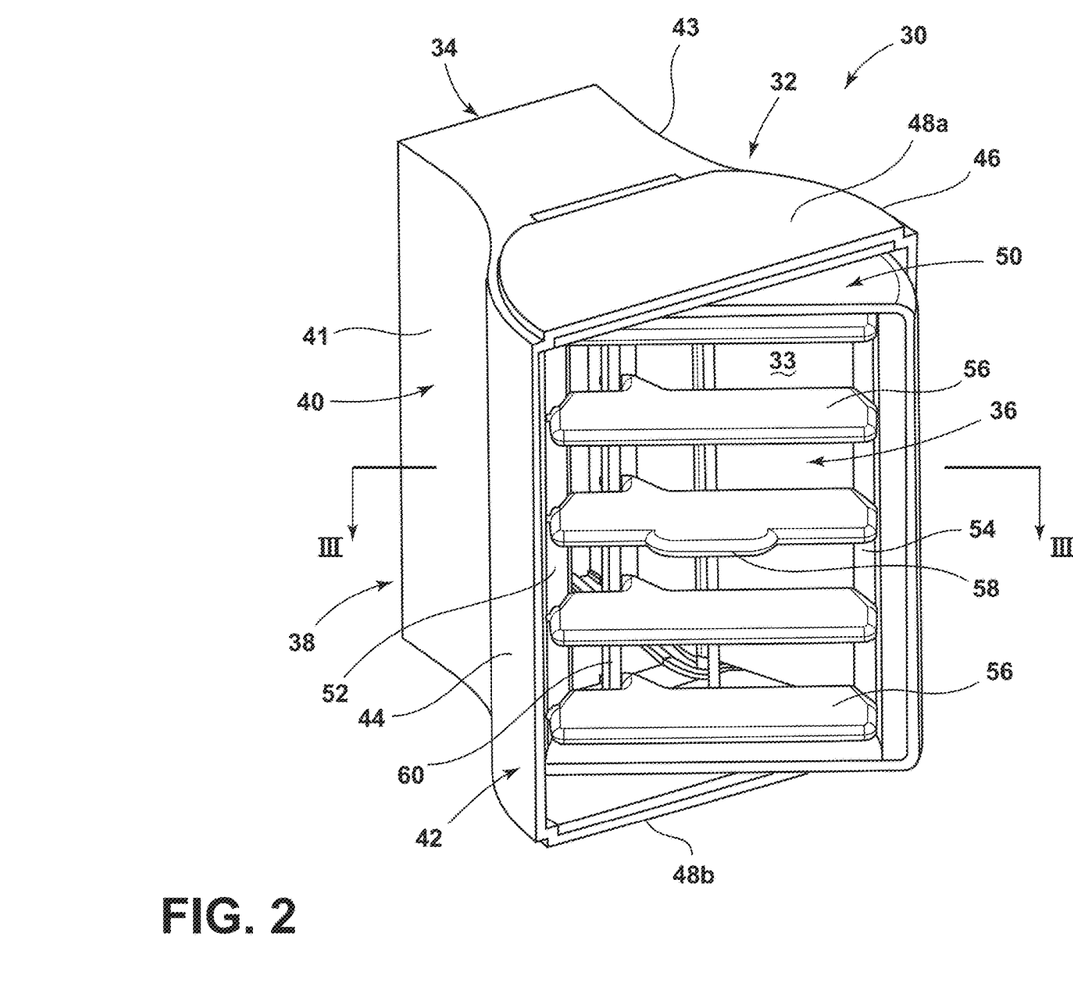
FIG. 2 is a front perspective view of an air register according to various aspects described herein.

Referring now to FIG. 2, the air register 30 is illustrated according to various aspects described herein. The air register 30 is shown removed from the vehicle 10 and is an example of the air registers 30A-30D described above. The air register 30 may include a vent housing 32 defining an interior 33, which is more clearly illustrated in FIG. 3A. The interior 33 may define an airflow passage. The vent housing 32 may include an inlet 34, and outlet 36 and a body portion 38 disposed therebetween. The vent housing 32 may be made of a polymeric material, such as, for example, a polypropylene composite. The material used to construct the vent housing 32 may be rigid or flexible to allow for assembly of components of the air register 30, which may include any suitable material. Furthermore, the air register 30 may be formed using any technique known in the art, which may include injection molding.

The body portion 38 may include a first portion 40 disposed adjacent to the inlet 34 and a second portion 42 disposed adjacent to the outlet 36. The first portion 40 may include opposing first and second sidewalls 41, 43. Likewise, the second portion 42 may include a first sidewall 44 and an opposing second sidewall 46, which may be integral with the first sidewall 41 and the second sidewall 43, respectively. The first sidewalls 41 and 44 and the second sidewalls 43 and 46 are spaced-apart from one another and may be interconnected by a top wall 48a and a bottom wall 48b. The first sidewall 44 and the second sidewall 46 of the second portion 42 may be in the form of walls having curved cross-sections. Thus, the first sidewall 44 and the second sidewall 46 may be opposing such that the second portion 42 includes a generally semi-cylindrical configuration. In some examples, the first sidewall 44 and the second sidewall 46 of the second portion 42 define a width greater than the width of the first portion 40 such that the first portion 40 is narrower than the second portion 42. Therefore, the second portion 42 may be wider than the first portion 40.

The air register 30 may include a frame assembly 50 which may be substantially disposed within the interior 33 of the second portion 42. The frame assembly 50 may include a generally rectangular shape having a first side 52 adjacent to the first sidewall 44 of the second portion 42 and a second side 54 adjacent to the second sidewall 46 of the second portion 42. A plurality of vanes 56 may be vertically spaced and disposed within the frame assembly 50. Each vane 56 may be pivotally coupled with the first side 52 and the second side 54. The vanes 56 may be rotatably coupled with a shaft 60 such that the vanes 56 may be pivoted upwardly and downwardly simultaneously. Additionally, the frame assembly 50 may be rotatably coupled with the top wall 48a and the bottom wall 48b, defining a vertical axis VA, which is better illustrated in FIGS. 4 and 5. In this way, the frame assembly 50 may be pivotally supported within the interior 33. At least one vane 56 may include a protrusion 58 for facilitating a pivoting movement of the vanes 56 and the frame assembly 50 by a user. In some examples, the frame assembly 50 may be pivoted between a first position and second position (FIG. 2), which will be described in greater detail below.

Figure 3A:
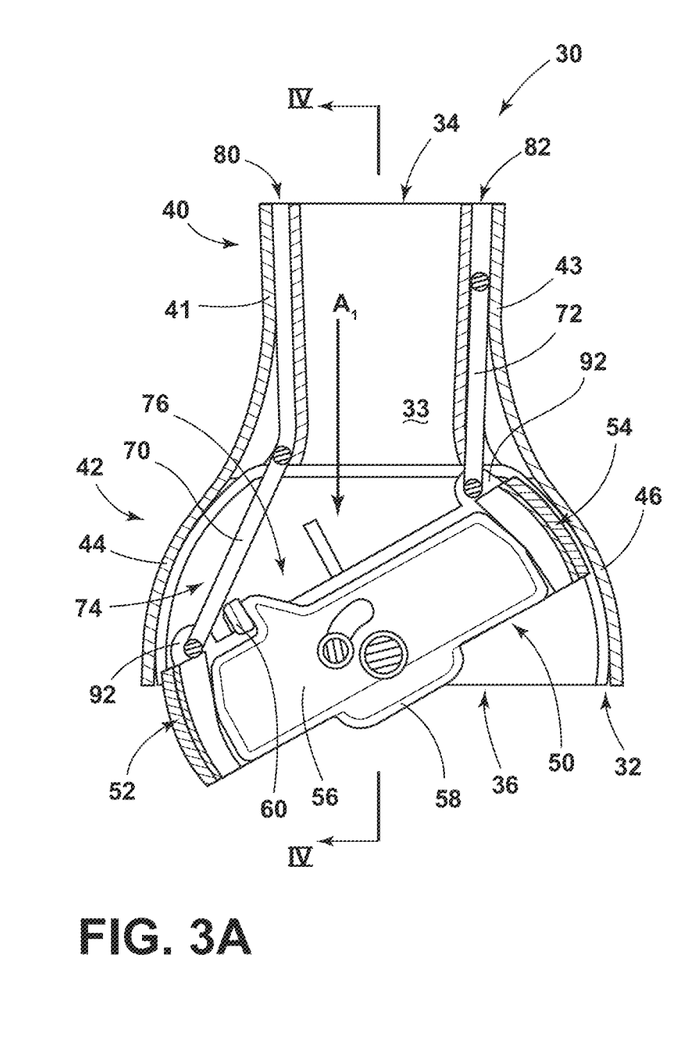
FIG. 3A is a cross-sectional view of the air register of FIG. 2 in a first position taken along line of FIG. 2 according to various aspects described herein.

FIG. 3A illustrates the air register 30 in a first position according to various aspects described herein. The air register 30 may further include a first panel 70 and a second panel 72, which may be in the form of flaps. While illustrated as planar, the first panel 70 and the second panel 72 may be in any suitable configuration. For example, the first panel 70 and the second panel 72 may be curved. Furthermore, the first and second panels 70, 72 may be rigid, or flexible. While illustrated as having two panels 70, 72, it is within the scope of aspects described herein for the air register 30 to include only one panel, or more than two panels. The first panel 70 and the second panel 72 may be spaced and define a first width less than a second width defined by the space between the first sidewall 44 and the second sidewall 46 of the second portion 42. The first panel 70 may be coupled with the first side 52 of the frame assembly 50 and the second panel 72 may be coupled with the second side 54 of the frame assembly 50. Additionally, the first panel 70 may be slideably coupled with the first portion 40 adjacent the first sidewall 41 and the second panel 72 may be slideably coupled with the first portion 40 adjacent the second sidewall 43. In some examples, the first and second panels 70, 72 may by slideably coupled with the first portion 40 via tracks 80 and 82, respectively, which is discussed in more detail in reference to FIGS. 4 and 5 below.

In some examples, the first position may be defined as the position of the frame assembly 50 where the first side 52 is pivoted outwardly such that the first side 52 may extend from the interior 33. Likewise, the second position may be defined as the position of the frame assembly 50 where the second side 54 is pivoted outwardly such that the second side 54 may extend from the interior 33. Therefore, the frame assembly 50 is operable between the first and second positions. In the first position, the first panel 70 may be in an extended position such that the first panel 70 may be substantially disposed within the second portion 42 of the vent housing 32, while the second panel 72 may be in a retracted position such that the second panel 72 may be substantially disposed within the first portion 40 of the vent housing 32. As such, in the second position, the first panel 70 may be in the retracted position such that the first panel 70 may be substantially disposed within the first portion 40 while the second panel 72 may be in the extended position such that the second panel 72 may be substantially disposed within the second portion 42.

In the first position, as illustrated in FIG. 3A, the first panel 70 may separate the interior 33 of the second portion 42 between a first chamber 74 and a second chamber 76. The second chamber 76 may be fluidically coupled with the airflow passage defined by the interior 33. In this way, the first chamber 74 may be disposed outside of the airflow passage. Stated another way, in the first position the first panel 70 may block a portion of the interior 33 adjacent the first sidewall 44 of the second portion 42. In some examples, in the first position the second panel 72 blocks a lesser portion of the interior 33 adjacent the second sidewall 46 of the second portion 42. Therefore, airflow $A_1$ entering the inlet 34 may be constrained to a passage defined by the first width of the first panel 70 and the second panel 72 and driven to a desired aiming direction at the outlet 36. Along these lines, in the second position the second panel 72 may separate the interior 33 of the second portion 42 between a first chamber and a second chamber. Therefore, in the second position the second panel 72 may block a portion of the interior 33 adjacent the second sidewall 46 of the second portion 42.

Figure 3B:
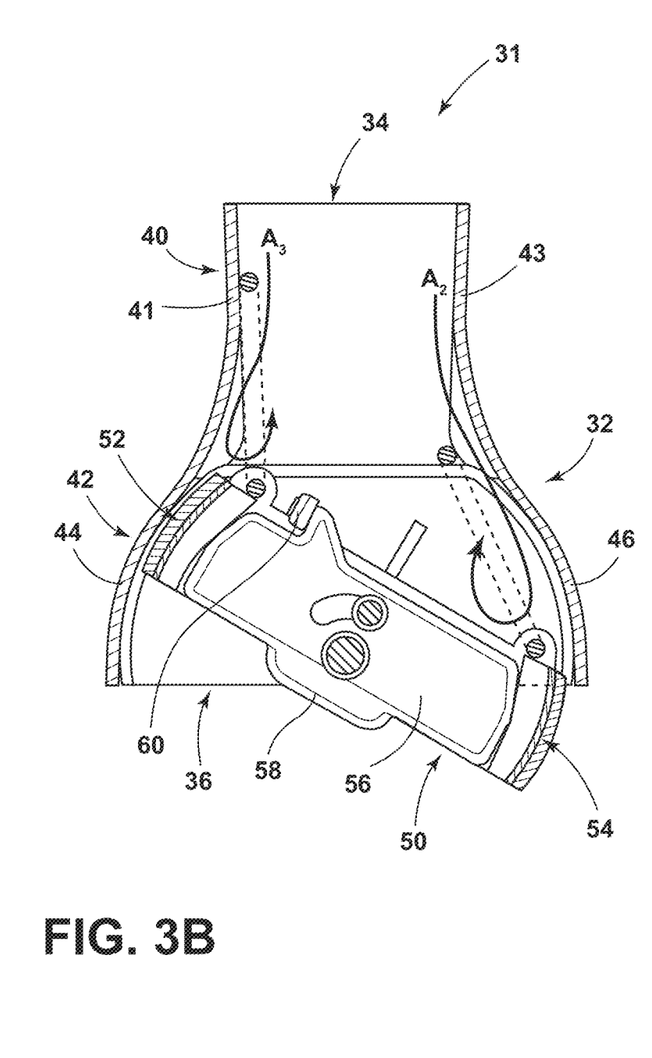
FIG. 3B is a cross-sectional view of an air register in a second position according to various aspects described herein.

Referring now to FIG. 3B, an air register 31 is illustrated for exemplary purposes. The air register 31 is similar to the air register 30. Therefore like parts will be identified with like numerals. One difference between the air register 31 and the air register 30 is that the air register 31 does not include first and second panels, which have been illustrated in phantom. Thus, the air register 31 does not include the benefits provided by the first and second panels 70, 72 of the air register 30. As such, airflow $A_2$ and $A_3$ entering the inlet 34 may not be constrained to a passage having a width less than the width defined by the space between the first sidewall 44 and the second sidewall 46 of the second portion 42. The air register 31 is illustrated in the second position where the second side 54 is pivoted outwardly such that the second side 54 may extend from the interior 33. As a portion of the interior 33 adjacent the second sidewall 46 of the second portion 42 is not blocked, airflow $A_2$ may come into contact with portions of the second sidewall 46 and become disrupted, causing recirculation of the airflow $A_2$ back towards the inlet 34. Similarly, airflow $A_3$ may come into contact with portions of the first sidewall 44 and may be recirculated away from the desired aiming direction.

Figures 4, 5:
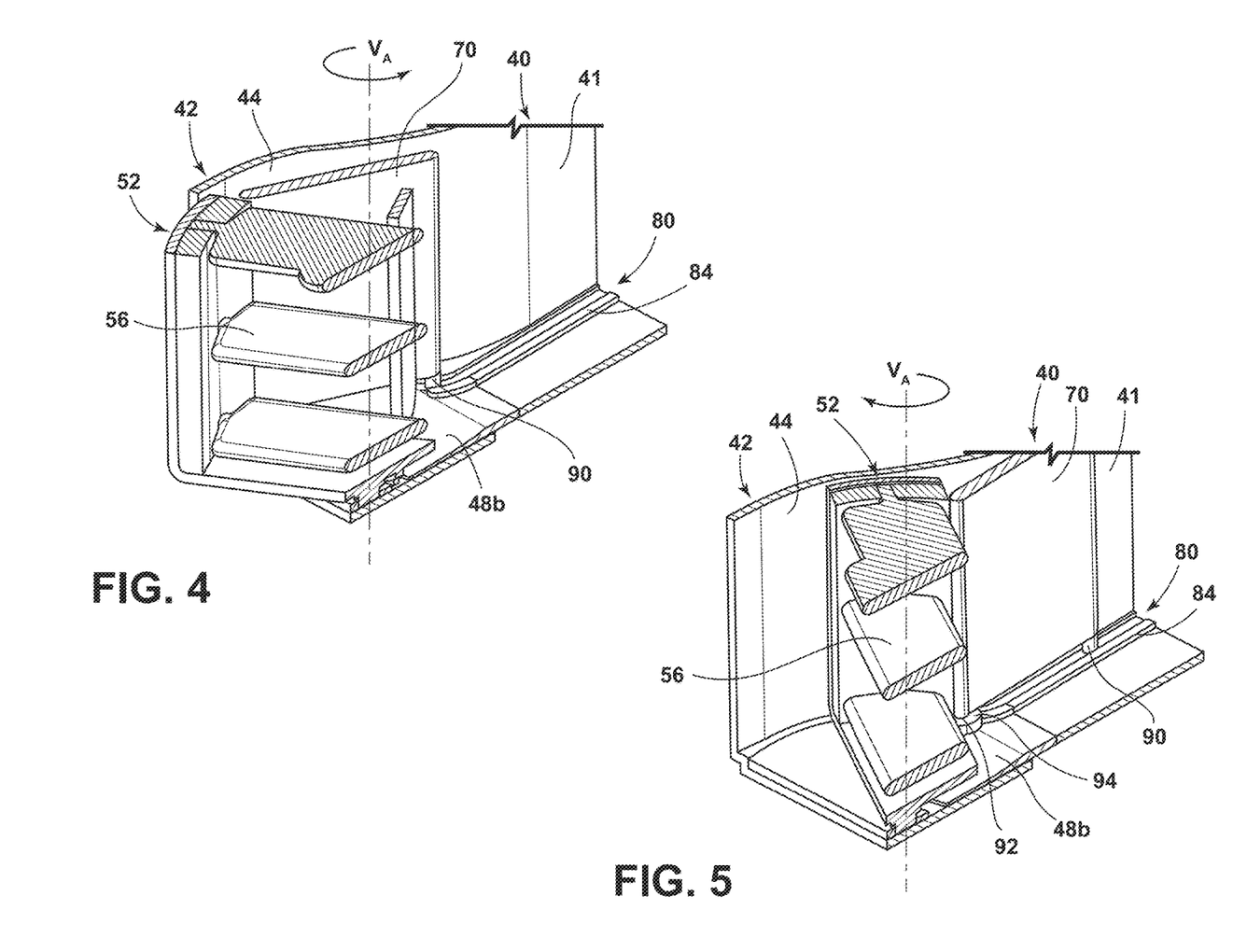
FIG. 4 is a cross-sectional view of the air register of FIG. 3A taken along line IV-IV of FIG. 3A in a first position according to various aspects described herein.
FIG. 5 is a cross-sectional view of the air register of FIG. 4 in a second position according to various aspects described herein.

FIG. 4 is a cross-sectional view of the air register 30 taken along line IV-IV of FIG. 3A more clearly illustrating the track 80 according to various aspects described herein. The description with respect to the track 80 applies to the track 82 as it relates to the second panel 72 in the same way that the first panel 70 is coupled with respect to the track 80. In FIG. 4, the air register 30 is shown in the first position. Thus, the first panel 70 is in the extended position. The first panel 70 may be slideably engaged with the first track 80 between the extended and retracted positions via the track 80. The track 80 may be disposed on the bottom wall 48b of the vent housing 32 and may extend along the first sidewall 41 of the first portion 40 and the first sidewall 44 of the second portion 42. Furthermore, the track 80 may include a ridge 84, which may be disposed along the track 80 extending substantially along the first sidewall 41. Alternatively, the ridge 84 may extend along substantially the entire length of the track 80. The track 80 may be configured to slideably receive at least one outwardly extending engagement feature 90 on the first panel 70. In some examples, the outwardly extending engagement feature 90 may be in the form of a protrusion, which may be cylindrical in shape.

In FIG. 5, the air register 30 is shown in the second position. Thus, the first panel 70 is in the retracted position. In some examples, as illustrated in FIG. 5, the first panel 70 may be coupled with the first side 52 of the frame assembly 50 via a linking hinge 92. The linking hinge 92 may be configured to receive an outwardly extending engagement feature 90. However, the linking hinge 92 may be in the form of any suitable hinge for rotatably coupling the first panel 70 with the frame assembly 50.

Figure 6:
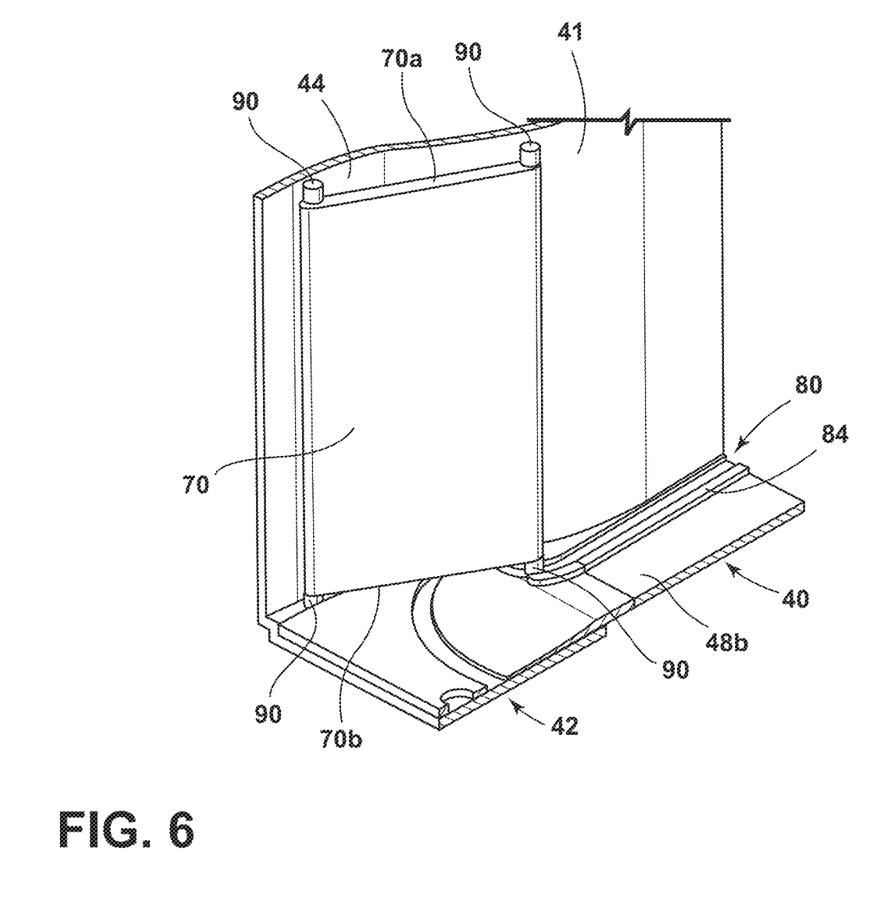
FIG. 6 is a view of a portion of the interior of the air register of FIG. 4 according to various aspects described herein.

Referring now to FIG. 6, the first panel 70 is more clearly illustrated as components of the air register 30 have been removed for viewing purposes. The description with respect to the first panel 70 and the first track 80 also applies to the second panel 72 and the second track 82. In some examples, the first panel 70 may span substantially the height of the interior 33 of the vent housing 32 (FIG. 3A) and may include two pairs of outwardly extending engagement features 90 at an upper portion 70a and a lower portion 70b of the first panel 70. In this way, a first, bottom pair of outwardly extending engagement features 90 may slideably engage the first panel 70 with the track 80. A second, upper pair of outwardly extending engagement features 90 may slideably engage the first panel 70 with an upper track (not shown for viewing purposes), which may be provided on the top wall 48a (FIG. 2). The upper track may be configured substantially the same as the first track 80. However, it is within the scope of aspects described herein for the upper track to be different from the first track 80. For example, the upper track may be shorter than the first track 80. Therefore, third and fourth tracks may be disposed on the top wall 48a such that the first panel 70 may be slideably engaged with the first track 80 and a third, upper, track between extended and retracted positions, and the second panel 72 may be slideably engaged with the second track 82 and a fourth, upper track between extended and retracted positions.

According to one aspect of the present disclosure, an air register includes a vent housing having an outlet, an inlet, and a body portion disposed therebetween. The body portion includes a first portion disposed adjacent to the inlet, and a second portion that is wider than the first portion disposed adjacent to the outlet and having opposed first and second sidewalls. A frame assembly is pivotally supported within an interior of the second portion and operable between first and second positions. The frame assembly includes a first side adjacent to the first sidewall of the second portion and a second side adjacent to the second sidewall of the second portion. The frame assembly further includes a first panel coupled with the first side and a second panel coupled with the second side. The first panel blocks a portion of the interior adjacent the first sidewall of the second portion of the vent housing when the frame assembly is in the first position, and the second panel blocks a portion of the interior adjacent the second sidewall of the second portion of the vent housing when the frame assembly is in the second position.

Embodiments of the first aspect of the invention can include any one or a combination of the following features:
  first and second tracks within an interior of the first portion of the vent housing. The first panel is slideably engaged with the first track between extended and retracted positions and the second panel is slideably engaged with the second track between extended and retracted positions;
  wherein the first panel and the second panel further comprise outwardly extending engagement features slideably received in the first track and the second track, respectively;
  the first track and the second track are disposed on a bottom wall of the first portion of the vent housing;
  third and fourth tracks within an interior of the first portion of the vent housing. The first panel is slideably engaged with the first and third tracks between extended and retracted positions and the second panel is slideably engaged with the second and fourth tracks between extended and retracted positions;
  the third track and the fourth track are disposed on a top wall of the first portion of the vent housing; and
  the second portion defines a first width and the first panel and the second panel define an airflow passage having a second width less than the first width.

According to another aspect of the present disclosure, an air register assembly includes a vent housing having an outlet, an inlet, and a body portion disposed therebetween. The body portion includes a first portion disposed adjacent to the inlet, and a second portion that is wider than the first portion disposed adjacent to the outlet. At least one panel slideably is coupled to the first portion of the vent housing between extended and retracted positions. The at least one panel is substantially disposed within the first portion of the vent housing when the at least one panel is in the retracted position, and the at least one panel is substantially disposed within the second portion of the vent housing when the at least one panel is in the extended position.

Embodiments of the second aspect of the invention can include any one or a combination of the following features:
  the at least one panel separates an interior portion of the second portion of the vent housing between first and second chambers when the at least one panel is in the extended position;
  the vent housing defines an airflow passage therethrough and the second chamber is fluidically coupled with the airflow passage;
  the first chamber is disposed outside of the airflow passage;
  at least one track within an interior of the first portion of the vent housing and the at least one panel is slideably engaged with the at least one track between extended and retracted positions;
  the at least one panel comprises outwardly extending engagement features slideably received in the at least one track; and
  the at least one track is disposed on a bottom wall of the first portion of the vent housing. A second panel slideably coupled to the first portion of the vent housing between extended and retracted positions and a second track within the interior of the first portion of the vent housing. The second panel is slideably engaged with the second track between extended and retracted positions.

According to yet another aspect of the present disclosure, an air register includes a vent housing having an outlet, an inlet, and a body portion disposed between the outlet and the inlet. The body portion includes a first portion disposed adjacent to the inlet, and a second portion disposed adjacent to the outlet. The second portion has a first sidewall and a second sidewall defining a first width. A frame assembly is pivotally supported within an interior of the second portion. The frame assembly includes a first side adjacent to the first sidewall of the second portion and a second side adjacent to the second sidewall of the second portion and at least one flap coupled with one of the first side the second side. The at least one flap constricts airflow from the inlet to the outlet to a second width less than the first width.

Embodiments of the third aspect of the invention can include any one or a combination of the following features:
  the first sidewall and the second sidewall of the second portion further include curved cross-sections;
  the at least one flap is configured to block a portion of the interior adjacent one of the first sidewall and the second sidewall of the second portion when the corresponding one of the first side and the second side of the frame assembly is pivoted outward from the interior;
  a top wall and a bottom wall and a track is provided in the interior and located on at least one of the top wall and bottom wall. The at least one flap is slidable within the track; and
  a second flap coupled with the other one of the first side the second side of the frame assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An air register, comprising:
  a vent housing including:
    an outlet;
    an inlet;
    a body portion disposed between the outlet and the inlet, wherein the body portion includes a first portion disposed adjacent to the inlet, and a second portion that is wider than the first portion disposed adjacent to the outlet and having opposed first and second sidewalls; and
    first and second tracks within an interior of the first portion of the vent housing;
  a frame assembly pivotally supported within an interior of the second portion and operable between first and second positions, wherein the frame assembly includes a first side adjacent to the first sidewall of the second portion and a second side adjacent to the second sidewall of the second portion; and
  a first panel coupled with the first side of the frame assembly via a first hinge, the first hinge configured to slideably engage the first track and a second panel coupled with the second side of the frame assembly via a second hinge, the second hinge configured to slideably engage the second track, wherein the first panel blocks a portion of the interior adjacent the first sidewall of the second portion of the vent housing when the frame assembly is in the first position, and further wherein the second panel blocks a portion of the interior adjacent the second sidewall of the second portion of the vent housing when the frame assembly is in the second position.

2. The air register of claim 1, wherein the first panel is slideably engaged with the first track between extended and retracted positions, further wherein the second panel is slideably engaged with the second track between extended and retracted positions.

3. The air register of claim 2, wherein the first panel and the second panel further comprise outwardly extending engagement features slideably received in the first track and the second track, respectively.

4. The air register of claim 3, wherein the first track and the second track are disposed on a bottom wall of the first portion of the vent housing.

5. The air register of claim 2, wherein the vent housing further comprises:
  third and fourth tracks within an interior of the first portion of the vent housing, wherein the first panel is slideably engaged with the first and third tracks between extended and retracted positions, further wherein the second panel is slideably engaged with the second and fourth tracks between extended and retracted positions.

6. The air register of claim 5, wherein the third track and the fourth track are disposed on a top wall of the first portion of the vent housing.

7. The air register of claim 1, wherein the second portion defines a first width and the first panel and the second panel define an airflow passage having a second width less than the first width.

8. An air register, comprising:
  a vent housing having an outlet, an inlet, and a body portion disposed between the outlet and the inlet, wherein the body portion includes a first portion disposed adjacent to the inlet, and a second portion disposed adjacent to the outlet, the second portion having a first sidewall and a second sidewall defining a first width and interconnected by a top wall and a bottom wall;

a frame assembly pivotally supported within an interior of the second portion, wherein the frame assembly includes a first side adjacent to the first sidewall of the second portion and a second side adjacent to the second sidewall of the second portion;

at least one track disposed on one of the top wall and the bottom wall of the vent housing and extending along the first sidewall of the first portion and the first sidewall of the second portion; and at least one flap coupled with one of the first side and the second side of the frame assembly via a hinge configured to slideably engage the at least one track, wherein the at least one flap constricts airflow from the inlet to the outlet to a second width less than the first width.

9. The air register of claim 8, wherein the first sidewall and the second sidewall of the second portion further comprise curved cross-sections.

10. The air register of claim 8, wherein the at least one flap is configured to block a portion of the interior adjacent one of the first sidewall and the second sidewall of the second portion when the corresponding one of the first side and the second side of the frame assembly is pivoted outward from the interior.

11. The air register of claim 8, wherein the vent housing further comprises:

a second flap coupled with the other one of the first side and the second side of the frame assembly.

\* \* \* \* \*